United States Patent
Chang et al.

(10) Patent No.: US 7,325,243 B2
(45) Date of Patent: Jan. 29, 2008

(54) DRIVING DEVICE FOR OBJECTIVE LENS OF OPTICAL PICKUP

(75) Inventors: Kirin Chang, Hsinchu (TW); Dop Chen, Hsinchu (TW)

(73) Assignee: TopRay Technologies, Inc., Hsinchu (TW)

( * ) Notice: Subject to any disclaimer, the term of this patent is extended or adjusted under 35 U.S.C. 154(b) by 704 days.

(21) Appl. No.: 10/843,750

(22) Filed: May 11, 2004

(65) Prior Publication Data

US 2005/0254357 A1 Nov. 17, 2005

(51) Int. Cl.
*G11B 7/085* (2006.01)
(52) U.S. Cl. .................................... 720/687
(58) Field of Classification Search ................ 720/687; 369/44.15, 44.16; 359/823, 824, 813, 814
See application file for complete search history.

(56) References Cited

U.S. PATENT DOCUMENTS

| | | | |
|---|---|---|---|
| 4,962,999 A * | 10/1990 | Kasuga | 359/896 |
| 5,627,687 A | 5/1997 | Fujisawa | 359/823 |
| 5,901,133 A * | 5/1999 | Miyamae et al. | 720/688 |
| 6,449,229 B1 * | 9/2002 | Kim et al. | 369/53.19 |
| 6,570,828 B2 * | 5/2003 | Kikuchi et al. | 369/44.32 |
| 6,915,526 B2 * | 7/2005 | Shinozuka | 720/672 |
| 7,046,590 B2 * | 5/2006 | Ikeda et al. | 369/44.15 |
| 2003/0234457 A1 * | 12/2003 | Ijima et al. | 264/1.7 |

* cited by examiner

*Primary Examiner*—Allen Cao

(57) ABSTRACT

The present invention discloses an electromagnetic driving device for an object lens of an optical pickup. The electromagnetic driving device comprises an object lens, a lens bearing seat, a focusing coil, a tracking coil, an auxiliary magnetic device, a base, a plurality of elastomers, and a top cover. The object lens, focusing coil, and tracking coil are fixed to the lens-bearing seat. The auxiliary magnetic device comprises a plurality of magnets fixed to the base. Each of the elastomers is attached to the lens-bearing seat and has an end fixed to the base. By utilizing electromagnetic forces generated by the coils and the auxiliary magnetic device, the object lens is moved to correct tracking deviations and focusing aberrations. The present invention enhances a utilization of the coils, which in turn improves a response time, and sensitivity of the electromagnetic driving device so that the optical pickup can be used in a high-speed optical recording device.

10 Claims, 4 Drawing Sheets

DRIVING DEVICE FOR OBJECTIVE LENS OF OPTICAL PICKUP

FIELD OF THE INVENTION

The present invention relates to a structure of a driving device, and more particularly to, a structure of an electromagnetic driving device for an object lens of an optical pickup. The device provides corrections to tracking deviations by moving the object lens perpendicular to the lens optical axis, and to focusing aberrations by moving the lens parallel to the lens' optical axis.

BACKGROUND OF THE INVENTION

A writable or rewritable recording device using an optical recording media, such as CD and DYD drives or Magneto-Optic (MO) drives, has become an important tool for data recording. Every such device includes an optical pickup unit for emitting a laser beam onto a data-recording surface of the optical recording media and detecting the reflected laser beam. The optical pickup unit contains a light source, such as a semiconductor laser device, for emitting the laser beam, and an object lens for focusing the laser beam onto the optical recording media. In addition, the optical pickup unit also contains a driving device for moving the objective lens parallel to its optical axis for correcting focusing aberrations and perpendicular to its optical axis for correcting tracking deviations. The laser beam is thereby focused on the data recording area and follows a recording track of the optical media precisely.

These days most optical pickup units use electromagnetic driving devices to move the objective lens. In an electromagnetic driving device, a focusing coil is used for correcting focusing aberration and another tracking coil is used for correcting the tracking deviations. The focusing coil causes the objective lens to move up or down along its optical axis, while the tracking coil causes the objective lens to move left or right perpendicular to its optical axis.

As the optical media's rotational speed is continuously increased to accelerate its accessing speed, the electromagnetic driving device for correcting tracking deviations and focusing aberrations is also continuously required to have a faster response time and a higher sensitivity. U.S. Pat. No. 5,627,687 discloses an electromagnetic driving device structure whose focusing coil and tracking coil have only up to 30-40% utilization and therefore have an inferior response time and sensitivity. It is usually considered that, to achieve a fast response time and a high sensitivity, using magnets with high magnetism or high-cost, lightweight materials is necessary.

SUMMARY OF THE INVENTION

The present invention provides a driving device for an optical pickup. The driving device comprises an objective lens, a lens bearing seat, a focusing coil, a tracking coil, an auxiliary magnetic device, a base, a plurality of linear elastomers, and a top cover. The lens-bearing seat is used to hold the object lens and to fix the focusing and tracking coils. The base is located underneath the lens-bearing seat and has a plurality of erect sections for fixing the auxiliary magnetic device. The auxiliary magnetic device comprises a plurality of magnets providing an auxiliary magnetic field. The magnets are spaced apart and positioned to form a closed magnetic space. The elastomers are attached to the lens bearing seat, and have their ends connected to the base. The lens-bearing seat is suspended by the elastomers so that the lens can be moved for correcting tracking deviations and focusing aberrations. Both the focusing coil and the tracking coil are positioned inside the closed magnetic space formed by the auxiliary magnetic device. The focusing coil is oriented in a way to have its axis parallel to the objective lens' optical axis. The tacking coil is oriented in a way to have its axis perpendicular to the object lens' optical lens. The axes of the focusing and tracking coils are therefore orthogonal to each other. By introducing electric currents into the focusing and tracking coils and alternating the currents' directions, electric currents carried by the coils will interfere with magnetic fields generated by the magnets. The lens-bearing seat is thereby moved to correct the tracking deviations and focusing aberrations. The top cover is at the top of the electromagnetic driving device, which is made of a material with permeance and provides a closed magnetic space and a protection to the coils and the auxiliary magnetic device.

In the present invention, the magnets of the auxiliary magnetic device are standing upright and fixed to the erect sections of the base. The magnets are arranged so that magnets of a same magnetic pole face each other and magnets of opposite magnetic poles neighbor with each other. A closed magnetic space is thereby formed among the magnets. The focusing and tracking coils are made of copper wires winded around in a same direction. The coils are placed completely inside the closed magnetic space generated by the auxiliary magnetic device. The coils therefore can have utilizations above 50% without using magnets with high magnetism or high-cost, lightweight materials. The response time and sensitivity of the electromagnetic device are thereby improved.

The foregoing and other objects, features, aspects and advantages of the present invention will become better understood from a careful reading of a detailed description provided herein below with appropriate reference to the accompanying drawings.

DETAILED DESCRIPTION OF THE PREFERRED EMBODIMENTS

Figure 1:
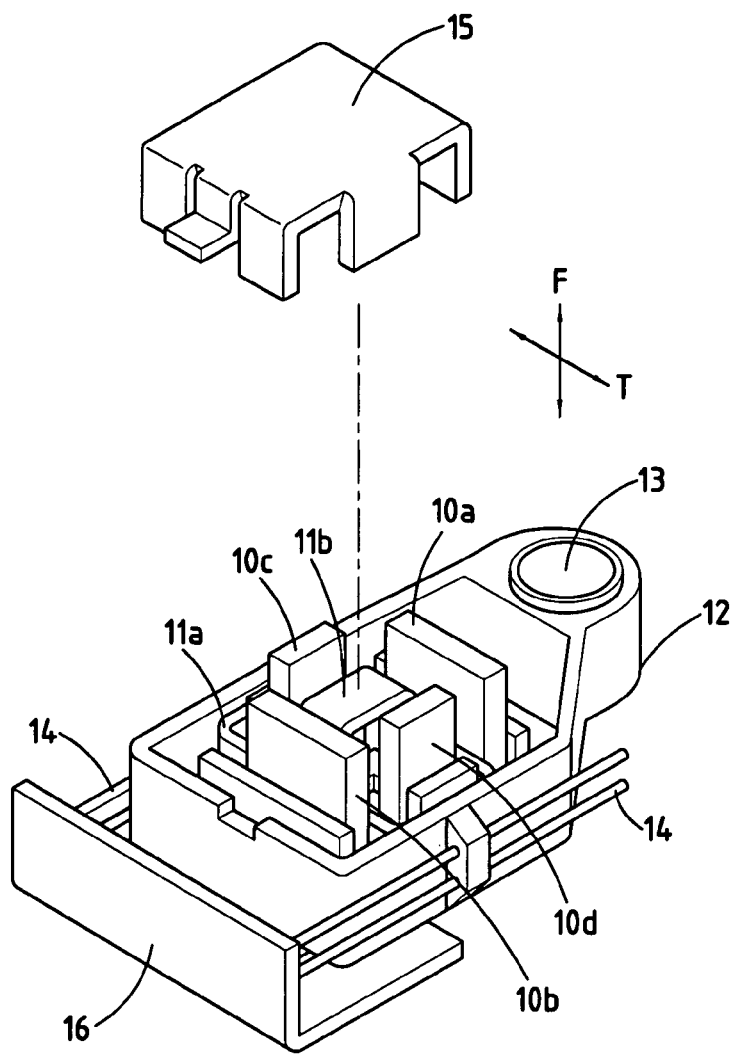
FIG. 1 is a schematic, structural diagram showing an electromagnetic driving device according to the present invention.

FIG. 1 is a schematic, structural diagram showing an electromagnetic driving device according to the present invention. As shown in FIG. 1, an object lens 13 is fixed in a lens frame of a lens-bearing seat 12. An auxiliary magnetic device, a focusing coil 11a, and a tracking coil 11b are positioned entirely in a rectangular, hollow section of the lens-bearing seat 12. A base 16 lies beneath the lens-bearing seat 12. A top cover 15 is on top of the lens-bearing seat 12. Four elastomers 14 are located at the lens bearing seat's sides, two on each of the seat's longer side. Every elastomer is attached to the lens bearing seat 12, and has an end connected to the base 16.

The auxiliary magnetic device comprises four magnets 10a, 10b, 10c, and 10d. Magnets 10a and 10b are of a same magnetic pole while magnets 10c and 10d are of another magnetic pole. For example, if magnets 10a and 10b are of magnetic pole North, then magnets 10c and 10d are of magnetic pole South. Or vice versa. Each of the four magnets is standing upright and positioned along a side of the rectangular section. The magnet 10a is positioned at the side close to the object lens. The magnets 10b is positioned at the opposite side facing the magnet 10a. Magnets 10c and 10d are positioned at the rest two sides facing each other. In this arrangement, magnets of a same magnetic pole face each other and magnets of opposite magnetic poles neighbor with each other. The magnets 10a, 10b, 10c, and 10d therefore form a closed magnetic space.

The focusing coil 11a is interposed between the magnets 10a and 10b but encloses the magnets 10c and 10d and the tracking coil 11b. A magnetic force generated by the focusing coil 11a is parallel to the object lens' optical axis (i.e., along an F direction as shown in FIG. 1). The tracking coil 11b is placed inside the magnets 10c and 10d, and the focusing coil 11a is placed in an orientation so that its magnetic force is perpendicular to the object lens' optical axis (i.e., along a T direction as shown in FIG. 1). The magnetic lines generated by the two coils are perpendicular to each other. In this arrangement, the lens bearing seat 12 can be moved up or down along the F direction for focusing, or left or right along the T direction for track seeking.

Figure 2:
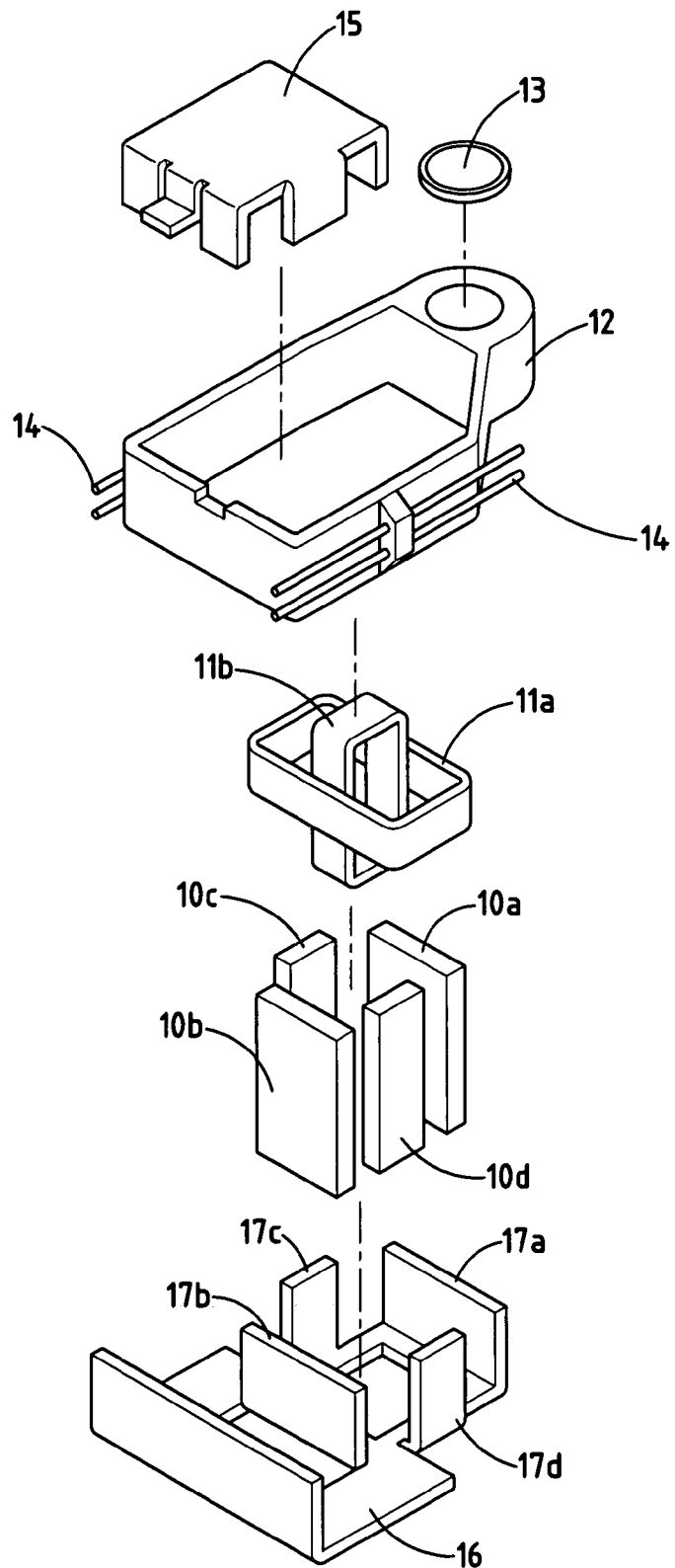
FIG. 2 is a schematic, exploded diagram showing an electromagnetic driving device according to the present invention.

FIG. 2 is a schematic, exploded diagram showing an electromagnetic driving device according to the present invention. As shown in FIG. 2, the base 16 has four erect sections 17a~d for fixing the magnets 10a~10d. The focusing coils 11a, the tracking coils 11b, and the object lens 13 are fixed on the lens-bearing seat 12. The top cover 15 is made of ferrous metal with permeance and is attached to the base 16. The elastomers provide elastic suspension to the lens-bearing seat 12 so that, under electromagnetic forces from the focusing coil 11a and the tracking coil 11b, the object lens 13 is movable for precise focusing and tracking.

Figure 3:
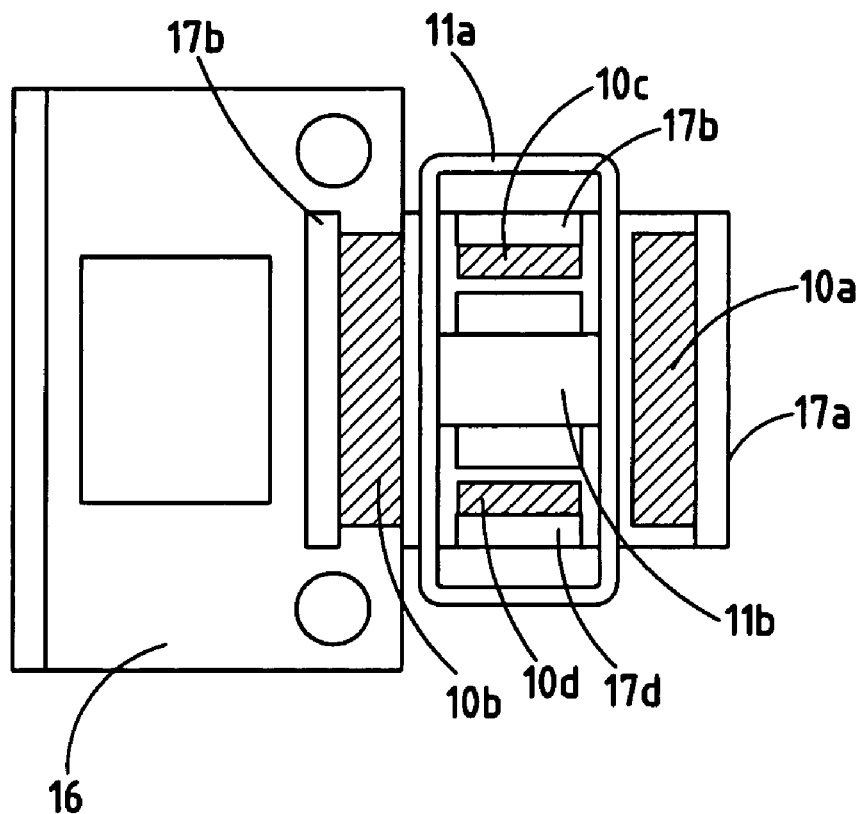
FIG. 3 is a schematic, top view showing a relative positioning of the auxiliary magnetic device and the coils.

FIG. 3 is a schematic, top view showing a relative positioning of the auxiliary magnetic device and the coils. As shown in FIG. 3, the focusing coil 11a is interposed between the magnets 10a and 10b and the tracking coil 11b is interposed between the magnets 10c and 10d. The focusing coil 11a encloses the tracking coil 11b, magnets 10c and 10d. The focusing coil 11a and the tracking coil 11b are perpendicular to each other. When an electric current is introduced into the focusing coil 11a, an electromagnetic force generated by the focusing coil will move lens-bearing seat 12 and hence the object lens 13 vertically toward a direction parallel to its optical axis. If the electric current is reversed, the focusing coil will generate an electromagnetic force that moves the object lens toward an opposite direction.

Figure 4:
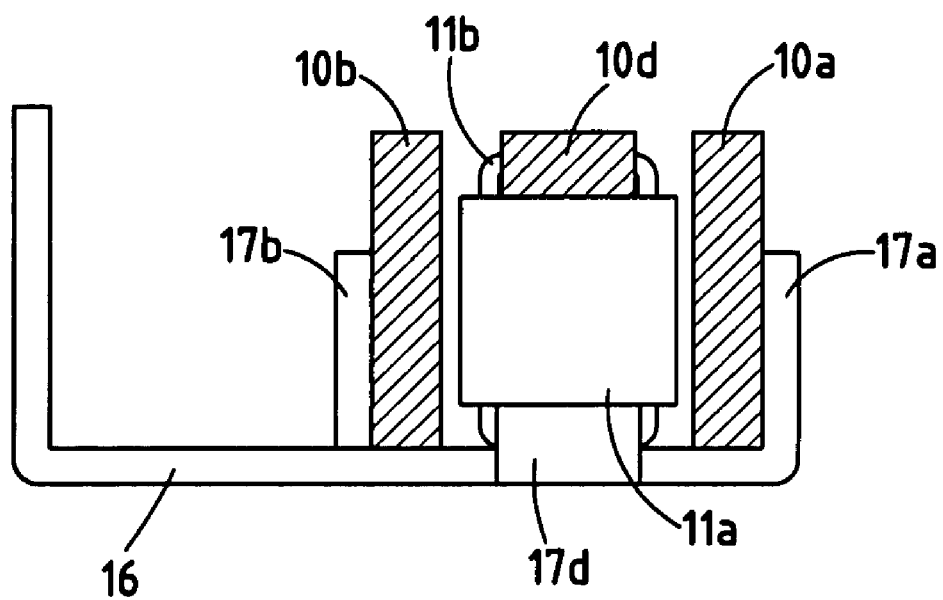
FIG. 4 is a schematic, lateral view showing a relative positioning of the auxiliary magnetic device and the coils.

FIG. 4 is a schematic, lateral view showing a relative positioning of the auxiliary magnetic device and the coils. As shown in FIG. 4, when an electric current is introduced into the tracking coil 11b, an electromagnetic force generated by the tracking coil will move lens bearing seat 12 and hence the object lens 13 horizontally toward a direction perpendicular to its optical axis. If the electric current is reversed, the tracking coil will generate an electromagnetic force that moves the object lens toward an opposite direction.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An electromagnetic driving device for an object lens of an optical pickup comprising:
    an object lens having an optical axis;
    a lens-bearing seat having a lens frame for carrying said object lens and defining said object lens' optical axis, said lens-bearing seat having a hollow rectangular section next to said lens frame;
    a base as a bottommost part to said electromagnetic driving device, wherein said base has a plurality of erect sections;
    an auxiliary magnetic device comprising a plurality of magnets having at least two pairs of magnets, wherein said magnets are fixed to said erect sections of said base and form a closed magnetic space therein;
    a focusing coil whose axis is parallel to said object lens' optical axis, wherein said focusing coil is placed within said closed magnetic space and fixed to said lens bearing seat;
    a tracking coil whose axis is perpendicular to said object lens' optical axis, wherein said tracking coil is placed within said closed magnetic space perpendicular to said focusing coil and fixed to said lens bearing seat;
    a plurality of elastomers, wherein each of said elastomers is attached to said lens bearing seat and has an end fixed to said base; and
    a top cover as a topmost part to said electromagnetic driving device, wherein said top cover is made of a material with permeance and provides protection to said focusing coil, said tracking coil, and said auxiliary magnetic device;
    wherein said auxiliary magnetic device, said focusing coil and said tracking coil are positioned entirely in said hollow rectangular section of said lens-bearing seat.

2. The electromagnetic driving device according to claim 1, wherein said plurality of magnets comprise an even number of magnets.

3. The electromagnetic driving device according to claim 1, wherein said plurality of magnets are standing upright and fixed to said erect sections of said base.

4. The electromagnetic driving device according to claim 1, wherein said plurality of magnets are positioned so that magnets of a same magnetic pole are spaced apart and face each other while magnets of opposite magnetic poles neighbor with each other.

5. The electromagnetic driving device according to claim 1, wherein said auxiliary magnetic device comprises four magnets which are standing upright and positioned to form a rectangular space so that magnets of a same magnetic pole are parallel and face each other while magnets of opposite magnetic poles are perpendicular and neighbor with each other.

6. The electromagnetic driving device according to claim 1, wherein said focusing coil is made of electric wires winded around in a same direction.

7. The electromagnetic driving device according to claim 1, wherein said tracking coil is made of electric wires winded around in a same direction.

8. The electromagnetic driving device according to claim 1, wherein said plurality of elastomers suspend said lens bearing seat and allow said lens bearing seat to move along a direction parallel to said object lens' optical axis for correcting focusing aberrations and along a direction perpendicular to said object lens' optical axis for correcting tracking deviations.

9. The electromagnetic driving device according to claim 1, wherein said top cover is made of ferrous metal with permeance.

10. The electromagnetic driving device according to claim 1, wherein said focusing coil is interposed between two opposite magnets of said plurality of magnets but encloses another two opposite magnets of said plurality of magnets and said tracking coil.

* * * * *